United States Patent
Sasaki et al.

(10) Patent No.: US 11,618,468 B2
(45) Date of Patent: *Apr. 4, 2023

(54) SERVER DEVICE, IN-VEHICLE DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Akira Sasaki, Miyoshi (JP); Jun Hioki, Nagakute (JP); Kazuki Matsumoto, Oogaki (JP); Fumio Wada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,649

(22) Filed: Feb. 18, 2022

(65) Prior Publication Data

US 2022/0169276 A1 Jun. 2, 2022

Related U.S. Application Data

(63) Continuation of application No. 16/898,510, filed on Jun. 11, 2020, now Pat. No. 11,279,377.

(30) Foreign Application Priority Data

Jul. 8, 2019 (JP) .............................. JP2019-126875

(51) Int. Cl.
*B60W 50/14* (2020.01)
*G08G 1/00* (2006.01)
(Continued)

(52) U.S. Cl.
CPC .......... *B60W 50/14* (2013.01); *G08G 1/0112* (2013.01); *G08G 1/207* (2013.01); *H04W 4/46* (2018.02);
(Continued)

(58) Field of Classification Search
CPC .......... B60W 50/14; B60W 2050/143; B60W 2050/146; G08G 1/0112; G08G 1/207;
(Continued)

(56) References Cited

U.S. PATENT DOCUMENTS

2010/0279648 A1* 11/2010 Song ................... H04W 36/16
455/404.1
2017/0322558 A1* 11/2017 Teshima ................ B60Q 3/20
2020/0160623 A1 5/2020 Hasegawa et al.

FOREIGN PATENT DOCUMENTS

JP 2013-061728 A 4/2013
JP 2014-090476 A 5/2014
(Continued)

OTHER PUBLICATIONS

Nov. 18, 2021 Notice of Allowance Issued in U.S. Appl. No. 16/898,510.

*Primary Examiner* — Abby Y Lin
*Assistant Examiner* — Hossam M Abd El Latif
(74) *Attorney, Agent, or Firm* — Oliff PLC

(57) ABSTRACT

A server device configured to communicate with a communication device mounted in a vehicle, the server device includes a controller configured to execute acquiring a position of an emergency vehicle, specifying a non-emergency vehicle at a predetermined distance from the position of the emergency vehicle, and transmitting, to a communication device mounted in the non-emergency vehicle, a request as information requiring the non-emergency vehicle to stop use of wireless communication.

20 Claims, 9 Drawing Sheets

(51) Int. Cl.
  *G08G 1/01*     (2006.01)
  *G08G 1/0965*   (2006.01)
  *G08G 1/0967*   (2006.01)
  *H04W 4/02*     (2018.01)
  *H04W 4/029*    (2018.01)
  *H04W 4/44*     (2018.01)
  *H04W 4/48*     (2018.01)
  *H04W 4/80*     (2018.01)
  *H04W 4/90*     (2018.01)
  *H04W 4/46*     (2018.01)

(52) U.S. Cl.
  CPC . *B60W 2050/143* (2013.01); *B60W 2050/146* (2013.01)

(58) Field of Classification Search
  CPC ........... G08G 1/0965; G08G 1/096716; G08G 1/096741; G08G 1/096775; H04W 4/46; H04W 4/027; H04W 4/023; H04W 4/025; H04W 4/44; H04W 4/029; H04W 4/48; H04W 4/80; H04W 4/90
  USPC ....................................................... 701/117
  See application file for complete search history.

(56) References Cited

FOREIGN PATENT DOCUMENTS

| | | |
|---|---|---|
| JP | 2018-160221 A | 10/2018 |
| WO | 2009147959 A1 | 12/2009 |
| WO | 2010/127331 A1 | 11/2010 |

* cited by examiner

| VEHICLE ID | POSITIONAL INFORMATION | RECEPTION DATE AND TIME |
|---|---|---|
| S001 | --- | 03/12/2018/10:00 |
| S002 | --- | 03/12/2018/09:55 |
| S003 | --- | 03/12/2018/10:05 |
| S004 | --- | 03/12/2018/09:50 |

SERVER DEVICE, IN-VEHICLE DEVICE, INFORMATION PROCESSING METHOD, AND STORAGE MEDIUM

CROSS REFERENCE TO RELATED APPLICATIONS

The present application is a Continuation of U.S. patent application Ser. No. 16/898,510, filed on Jun. 11, 2020, which claims priority to Japanese Patent Application No. 2019/126875, filed on Jul. 8, 2019. The contents of these applications are incorporated herein by reference in their entirety.

INCORPORATION BY REFERENCE

The disclosure of Japanese Patent Application No. 2019-126875 filed on Jul. 8, 2019 including the specification, drawings and abstract is incorporated herein by reference in its entirety.

BACKGROUND

1. Technical Field

The present disclosure relates to a server device, an in-vehicle device, an information processing method, and a storage medium.

2. Description of Related Art

In recent years, communication techniques for a vehicle, such as Vehicle-to-Everything (V2X), have been developed. Accordingly, vehicles in which equipment capable of performing communication with external equipment is mounted have also been developed. With a vehicle in which such equipment is mounted, for example, an emergency vehicle can transmit positional information of the host vehicle to a general vehicle, and the general vehicle that receives the positional information of the emergency vehicle can notify a driver of the positional information of the emergency vehicle (for example, see Japanese Unexamined Patent Application Publication No. 2018-160221 (JP 2018-160221 A)).

SUMMARY

Incidentally, in order for the emergency vehicle to quickly arrive at a destination or in order for an occupant of the emergency vehicle to perform quick and accurate work at the destination, acquisition of information through wireless communication while the emergency vehicle is moving is a key factor. However, the emergency vehicle is not always traveling in an area where wireless communication of a large-capacity and high-speed communication system is usable. A traveling route of the emergency vehicle deviates from the area, the quality of communication to be performed by a communication device mounted in the emergency vehicle may be degraded. In particular, in a case where wireless communication with a large data transfer amount is performed in a vehicle near the emergency vehicle, communication traffic increases, and the quality of communication to be performed by the communication device of the emergency vehicle is likely to be degraded. As a result, there is a possibility that acquisition of information through wireless communication while the emergency vehicle is moving is not suitably performed.

The disclosure provides a technique effective in securing the quality of communication to be performed by a communication device mounted in an emergency vehicle.

A server device according to a first aspect of the disclosure is configured to communicate with a communication device mounted in a vehicle. The server device includes a controller configured to execute acquiring a position of an emergency vehicle, specifying a non-emergency vehicle at a predetermined distance from the position of the emergency vehicle, and transmitting, to a communication device mounted in the non-emergency vehicle, a communication stop request as information for prompting an occupant of the non-emergency vehicle to stop use of wireless communication.

An in-vehicle device according to a second aspect of the disclosure is mounted in an emergency vehicle and configured to communicate with a device outside the emergency vehicle. The in-vehicle device includes a controller configured to execute transmitting, to a communication device mounted in a non-emergency vehicle, a communication stop request as information for prompting an occupant of the non-emergency vehicle at a predetermined distance from a position of the emergency vehicle to stop use of wireless communication while the emergency vehicle is traveling for an emergency.

An in-vehicle device according to a third aspect of the disclosure is mounted in a non-emergency vehicle and configured to communicate with a device outside the non-emergency vehicle. The in-vehicle device characterized by comprising a controller configured to execute receiving a communication stop request as information for prompting an occupant of the non-emergency vehicle to stop use of wireless communication, and prompting the occupant of the non-emergency vehicle to stop the use of the wireless communication when receiving the communication stop request.

The disclosure also relates to an information processing method including at least a part of the above-described processing or relates to an information processing program that implements the method or a non-transitory storage medium that stores the information processing program. For example, an information processing method according to a fourth aspect of the disclosure includes acquiring, by a computer, a position of an emergency vehicle, specifying, by the computer, a non-emergency vehicle at a predetermined distance from the position of the emergency vehicle, and transmitting, by the computer, a communication stop request as information for prompting an occupant of the non-emergency vehicle to stop use of wireless communication to a communication device mounted in the non-emergency vehicle.

A non-transitory storage medium according to a fifth aspect of the disclosure stores instructions that are executable by one or more processors and that cause the one or more processors to perform functions including: acquiring a position of an emergency vehicle; specifying a non-emergency vehicle at a predetermined distance from the position of the emergency vehicle; and transmitting a communication stop request as information for prompting an occupant of the non-emergency vehicle to stop use of wireless communication to a communication device mounted in the non-emergency vehicle.

According to the aspects of the disclosure, it is possible to provide a technique effective in securing the quality of communication to be performed by a communication device of an emergency vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
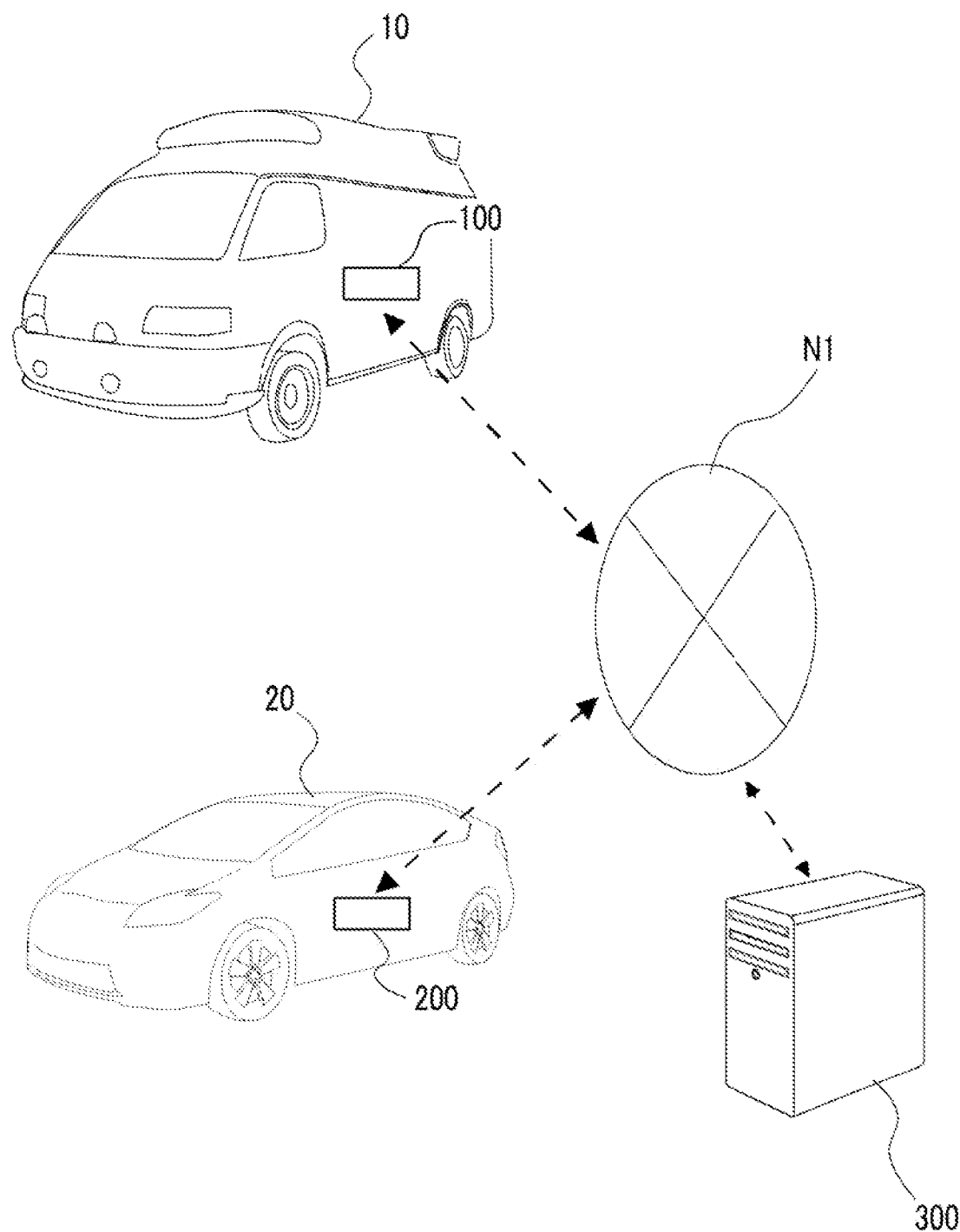
FIG. 1 is a diagram illustrating the outline of a vehicle management system.

An embodiment of the disclosure relates to a server device that is able to perform communication with a communication device mounted in a vehicle. Here, in a vehicle (emergency vehicle) that travels on a road to achieve an emergency task, such as a first-aid vehicle, a firefighting vehicle, or a police vehicle, in a case where an occupant of the emergency vehicle can accurately ascertain congestion information of the road or the details (a state of a person to be rescued, a situation of damage to a destination, and the like) of an emergency, it is possible to allow the emergency vehicle to quickly arrive at the destination, and to allow the occupant of the emergency vehicle to quickly and accurately perform rescue activities when the emergency vehicle arrives at the destination. For this reason, while the emergency vehicle is moving, a communication device mounted in the emergency vehicle needs to perform high-quality and stable communication. However, the emergency vehicle is not always traveling in an area where wireless communication of a large-capacity and high-speed communication system is usable. When a traveling route of the emergency vehicle deviates from the above-described area, the quality of communication to be performed by the communication device of the emergency vehicle may be degraded. In particular, when the number of vehicles that perform wireless communication near the emergency vehicle is large or when wireless communication with a large data transfer amount is performed in a vehicle near the emergency vehicle, or the like, the communication quality may be degraded due to an increase in communication traffic.

In contrast, in the server device according to the embodiment of the disclosure, a controller acquires a position of the emergency vehicle and specifies a non-emergency vehicle at a predetermined distance from the position of the emergency vehicle. The term "predetermined distance" used herein is a distance at which, in a case where wireless communication is performed in the non-emergency vehicle within the predetermined distance from the position of the emergency vehicle, the quality of communication to be performed by the communication device of the emergency vehicle is assumed to be affected, and is determined in advance based on a result or the like of an experiment or a simulation. The controller transmits a communication stop request to a communication device mounted in the specified non-emergency vehicle. The term "communication stop request" used herein is information for prompting an occupant of the non-emergency vehicle to stop use of wireless communication. With this, in the non-emergency vehicle that receives the communication stop request, it is possible to make the occupant of the non-emergency vehicle recognize the approach of the emergency vehicle and stop the use of wireless communication. As a result, it is possible to suppress an increase in communication traffic near the emergency vehicle. Thus, it is possible to allow the communication device of the emergency vehicle to perform high-quality and stable communication. That is, it is possible to secure the quality of communication to be performed by the communication device of the emergency vehicle. The term "the stop of the use of wireless communication" in the disclosure is not limited to an aspect for solely wireless communication using the communication device (in-vehicle device) mounted in the non-emergency vehicle, and may be an aspect for wireless communication using a terminal carried by the occupant of the non-emergency vehicle.

Here, in a case where a use stop time of wireless communication in the non-emergency vehicle is extended needlessly, there is a possibility that the convenience of the occupant is degraded. Thus, after the distance between the non-emergency vehicle and the emergency vehicle is greater than the predetermined distance, it is suitable to rapidly release the stop of the use of wireless communication. In contrast, a method in which the server device transmits, to the in-vehicle device of the non-emergency vehicle, information to the effect that the stop of the use of wireless communication is releasable when the distance between the non-emergency vehicle and the emergency vehicle is greater than the predetermined distance is considered. However, in a case where the occupant of the non-emergency vehicle turns off a wireless communication function of the in-vehicle device upon receiving the communication stop request, the in-vehicle device cannot receive information described above, and there is a possibility that the occupant of the non-emergency vehicle misses a timing of releasing the stop of the use of wireless communication. Accordingly, information indicating a time (communication stop time) during which the use of wireless communication is stopped may be included in the communication stop request transmitted from the server device to the communication device of the non-emergency vehicle. The term "communication stop time" used herein is, for example, a predicted time needed from when the distance between the emergency vehicle and the non-emergency vehicle is shortened within the predetermined distance until the distance between the emergency vehicle and the non-emergency vehicle is widened to a distance greater than the predetermined distance or a time obtained by adding a margin to the predicted time. Such a communication stop time can be calculated based on at least one of a traveling speed of the emergency vehicle, congestion information of a route along which the emergency vehicle is traveling, and the like. In a case where the communication stop time calculated in such a manner is included in the communication stop request, the occupant of the non-emergency vehicle can restart the use of wireless communication using the communication stop time as a reference. With this, it is possible to minimize degradation of the convenience of the occupant of the non-emergency vehicle.

The server device according to the embodiment of the disclosure may not transmit the communication stop request to the in-vehicle device of the non-emergency vehicle at the predetermined distance from the position of the emergency vehicle in a case where the position of the emergency vehicle is within an area where a predetermined communication system is usable. That is, the server device may transmit the communication stop request to the in-vehicle device of the non-emergency vehicle within the predetermined distance from the position of the emergency vehicle solely when the position of the emergency vehicle deviates from the area where the predetermined communication system is usable. The term "predetermined communication system" used herein is, for example, a communication system in which high-speed and large-capacity wireless communication can be performed, and even though wireless communication with a comparatively large data transfer amount is performed in the non-emergency vehicle near the emergency vehicle, the quality of wireless communication can be secured in the emergency vehicle, such as 5th-Generation (5G) or a mobile communication standard after 5G. According to such a configuration, in a case where the position of the emergency vehicle is within the area where the predetermined communication system is usable, it is possible to allow wireless communication to be continuously used in the non-emergency vehicle within the predetermined distance from the position of the emergency vehicle while securing the quality of wireless communication in the emergency vehicle. With this, it is possible to further minimize degradation of the convenience of the occupant of the non-emergency vehicle.

At least a pan of processing that is executed by the server device as described above may be executed by the in-vehicle device of the emergency vehicle. The term "in-vehicle device" used herein is a device having a function of performing communication with equipment outside the emergency vehicle. Then, the in-vehicle device may transmit the communication stop request to the communication device of the non-emergency vehicle within the predetermined distance from the position of the emergency vehicle while the emergency vehicle is traveling for an emergency. In this case, the in-vehicle device may transmit the communication stop request using, for example, using short-distance communication in which a communicable distance is the same as the predetermined distance. With this, even though processing for specifying the non-emergency vehicle within the predetermined distance from the position of the emergency vehicle is not executed on the emergency vehicle side, it is possible to transmit the communication stop request solely to the non-emergency vehicle within the predetermined distance from the position of the emergency vehicle. As a method of implementing short-distance communication described above, for example, a method using data communication based on a communication standard, such as a Bluetooth (Registered Trademark) Low Energy standard (hereinafter, referred to as BLE), Near Field Communication (NFC), Ultra Wideband (UWB), or Wi-Fi (Registered Trademark), can be exemplified.

Hereinafter, a specific embodiment of the disclosure will be described referring to the drawings. The dimensions, materials, shapes, relative arrangements, and the like of components described in the embodiment are not intended to limit the scope of the disclosure to these alone in particular as long as there are no specific statements.

First Embodiment

In the embodiment, an example where the disclosure is applied to a system (hereinafter, referred to as a "vehicle management system") that manages vehicles traveling on a road will be described. The vehicles to be managed by the vehicle management system include emergency vehicles (for example, vehicles for first-aid (first-aid vehicles), vehicles for firefighting (firefighting vehicles), vehicles for police (police vehicles), and the like)), and non-emergency vehicles (for example, passenger vehicles or commercial vehicles).

Outline of Vehicle Management System

FIG. 1 is a diagram showing the schematic configuration of the vehicle management system. The vehicle management system in the embodiment includes an in-vehicle device 100 (hereinafter, referred to as a "first in-vehicle device 100") mounted in an emergency vehicle 10, an in-vehicle device 200 (hereinafter, referred to as a "second in-vehicle device 200") mounted in a non-emergency vehicle 20, and a server device 300. The first in-vehicle device 100 and the second in-vehicle device 200 can be connected to a network N1 using, for example, mobile communication, such as 5G or Long Term Evolution (LTE), narrowband communication, such as Dedicated Short Range Communications (DSRC), or wireless communication, such as Wi-Fi (Registered Trademark). The server device 300 can be connected to the network N1 using wired communication or wireless communication. As the network N1, for example, a wide area network (WAN) as a worldwide public communication network, such as the Internet, or other communication networks can be employed. In the example shown in FIG. 1, although solely one emergency vehicle 10 and solely one non-emergency vehicle 20 are shown, a plurality of emergency vehicles 10 and a plurality of non-emergency vehicles 20 may be provided.

The first in-vehicle device 100 acquires a current position of the emergency vehicle 10 and transmits information (positional information) indicating the acquired current position to the server device 300. The acquisition of the current position and the transmission of the positional information in the first in-vehicle device 100 are repeatedly performed in a predetermined cycle when the emergency vehicle 10 is in an emergency traveling state.

The second in-vehicle device 200 acquires a current position of the non-emergency vehicle 20 and transmits information (positional information) indicating the acquired current position to the server device 300. The acquisition of the current position and the transmission of the positional information in the second in-vehicle device 200 are repeatedly performed in a predetermined cycle when the non-emergency vehicle 20 is in an operation state (for example, a state in which an ignition switch is turned on).

The server device 300 specifies the non-emergency vehicle 20 within a predetermined distance from the current position of the emergency vehicle 10 based on the positional information received from the first in-vehicle device 100 and the positional information received from the second in-vehicle device 200. Then, the server device 300 transmits a communication stop request to the second in-vehicle device 200 of the specified non-emergency vehicle 20. The term "communication stop request" in the example is information for prompting an occupant of the specified non-emergency vehicle to stop use of wireless communication. The communication stop request in the example is information for making the second in-vehicle device 200 execute processing for prompting the occupant to stop the use of wireless communication. The second in-vehicle device 200 that receives such a communication stop request executes processing for notifying the occupant of the approach of the emergency vehicle 10 and the processing for prompting the occupant to stop the use of wireless communication. Through the processing, it is possible to make the occupant of the non-emergency vehicle 20 recognize the approach of the emergency vehicle 10 and to stop the use of wireless communication in the second in-vehicle device 200 or a portable terminal (a smartphone, a tablet terminal, a wearable terminal, or the like carried with the occupant). As a result, it is possible to reduce communication traffic near the emergency vehicle 10.

Hardware Configuration

Figure 2:
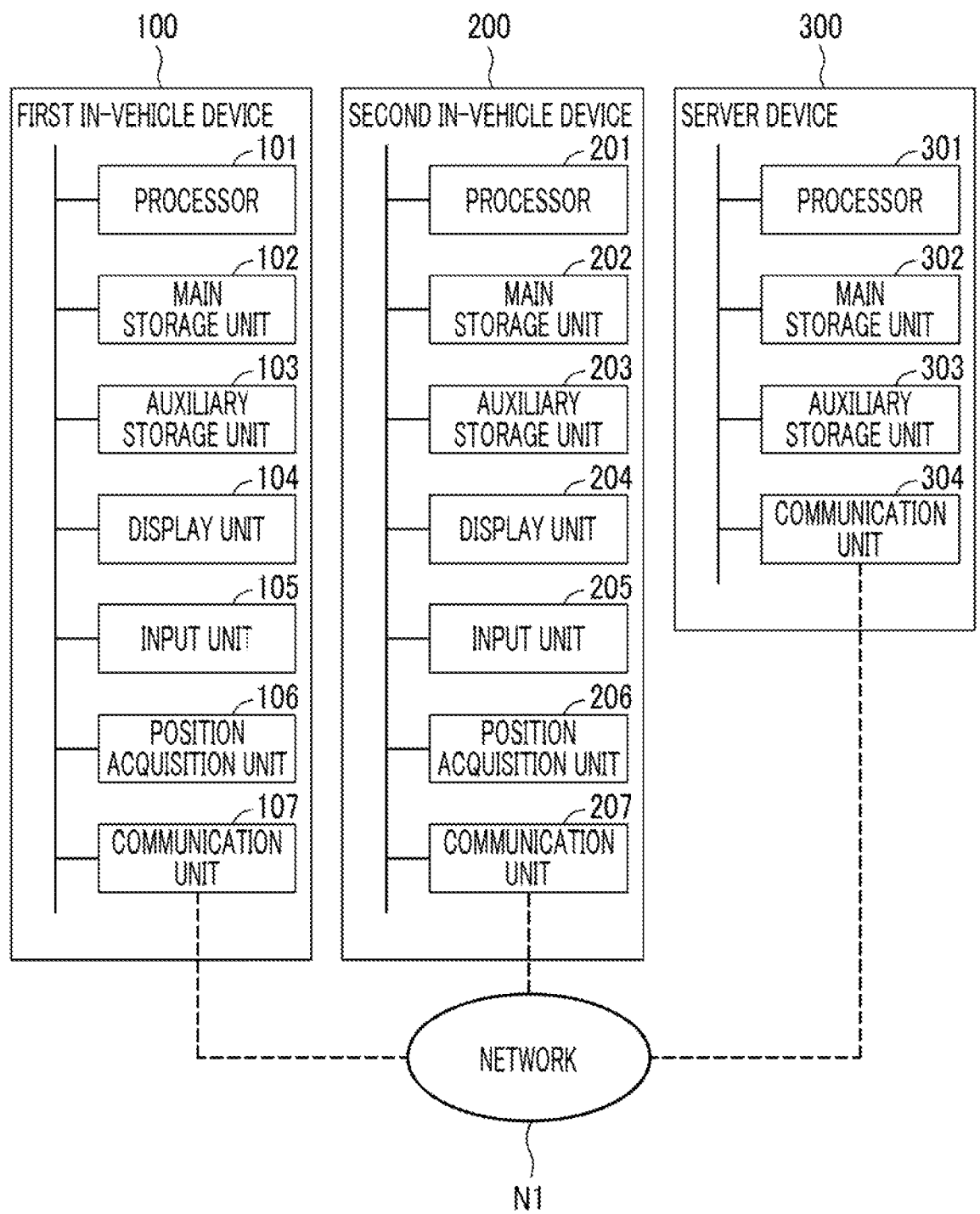
FIG. 2 is a diagram showing an example of the hardware configuration of each of a first in-vehicle device, a second in-vehicle device, and a server device in a first embodiment.

FIG. 2 is a diagram showing an example of the hardware configuration of each of the first in-vehicle device 100, the second in-vehicle device 200, and the server device 300.

The server device 300 has the configuration of a general computer. That is, the server device 300 has a processor 301, a main storage unit 302, an auxiliary storage unit 303, and a communication unit 304. The units are connected to one another by a bus. The main storage unit 302 and the auxiliary storage unit 303 are computer-readable recording mediums. The hardware configuration of the computer is not limited to the example shown in FIG. 2, and components may be suitably omitted, replaced, and added.

In the server device 300, the processor 301 loads a program stored in a recording medium into a work area of the main storage unit 302 and executes the program, and respective functional constituent units and the like are controlled with the execution of the program, whereby a function conforming to a predetermined purpose is implemented.

The processor 301 is, for example, a central processing unit (CPU) or a digital signal processor (DSP). The processor 301 controls the server device 300 and performs arithmetic operations of various kinds of information processing. The main storage unit 302 includes, for example, a random access memory (RAM) or a read only memory (ROM). The auxiliary storage unit 303 is, for example, an erasable programmable ROM (EPROM) or a hard disk drive (HDD). The auxiliary storage unit 303 can include a removable medium, that is, a portable recording medium. The removable medium is, for example, a universal serial bus (USB) memory or a disc recording medium, such as a compact disc (CD) or a digital versatile disc (DVD).

The auxiliary storage unit 303 stores various programs, various kinds of data, and various tables in a recording medium in a readable and writable manner. In the auxiliary storage unit 303, an operating system (OS), various programs, various tables, and the like are stored. A part or all of the above-described information may be stored in the main storage unit 302. Information that is stored in the main storage unit 302 may be stored in the auxiliary storage unit 303.

The communication unit 304 performs transmission and reception of information between an external device and the server device 300. The communication unit 304 is, for example, a local area network (LAN) interface board or a wireless communication circuit for wireless communication. The LAN interface board or the wireless communication circuit is connected to the network N1.

A series of processing that is executed by the server device 300 configured as above can be executed by hardware, but can also be executed by software.

Next, the first in-vehicle device 100 is, for example, a car navigation system that is mounted in the emergency vehicle 10 and can be connected to the server device 300 through the network N1. The first in-vehicle device 100 may be a personal computer (PC) that is connected to the server device 300 through the network N1. The first in-vehicle device 100 may be, for example, a small computer that can be carried with the occupant of the emergency vehicle 10, such as a smartphone, a mobile phone, a tablet terminal, a personal digital assistant, or a wearable computer (a smart watch or the like).

As shown in FIG. 2, the first in-vehicle device 100 has a processor 101, a main storage unit 102, an auxiliary storage unit 103, a display unit 104, an input unit 105, a position acquisition unit 106, and a communication unit 107. The processor 101, the main storage unit 102, and the auxiliary storage unit 103 are the same as the processor 301, the main storage unit 302, and the auxiliary storage unit 303 of the server device 300, and thus, description thereof will not be repeated. The display unit 104 is, for example, a liquid crystal display (LCD), an electroluminescence (EL) panel, or the like. The input unit 105 includes, for example, a touch panel or push buttons capable of inputting symbols, such as characters, a microphone capable of inputting voice, and the like. The position acquisition unit 106 is equipment that acquires a current position of the first in-vehicle device 100 (the current position of the emergency vehicle 10), and typically includes a GPS receiver and the like. The communication unit 107 is a communication circuit that accesses the network N1 using, for example, wireless communication, such as a mobile communication service, and performs data communication with the server device 300 and the like.

The second in-vehicle device 200 is, for example, a car navigation system that is mounted in the non-emergency vehicle 20 and can be connected to the server device 300 through the network N1. The second in-vehicle device 200 may be a personal computer (PC) that is connected to the server device 300 through the network N1. The second in-vehicle device 200 may be, for example, a small computer that can be carried with the occupant of the non-emergency vehicle 20, such as a smartphone, a mobile phone, a tablet terminal, a personal digital assistant, or a wearable computer (a smart watch or the like).

As shown in FIG. 2, the second in-vehicle device 200 has a processor 201, a main storage unit 202, an auxiliary storage unit 203, a display unit 204, an input unit 205, a position acquisition unit 206, and a communication unit 207. The processor 201, the main storage unit 202, the auxiliary storage unit 203, the display unit 204, the input unit 205, the position acquisition unit 206, and the communication unit 207 are the same as the processor 101, the main storage unit 102, the auxiliary storage unit 103, the display unit 104, the input unit 105, the position acquisition unit 106, and the communication unit 107 of the first in-vehicle device 100, and thus, description thereof will not be repeated.

Functional Configuration of Server Device

Figure 3:
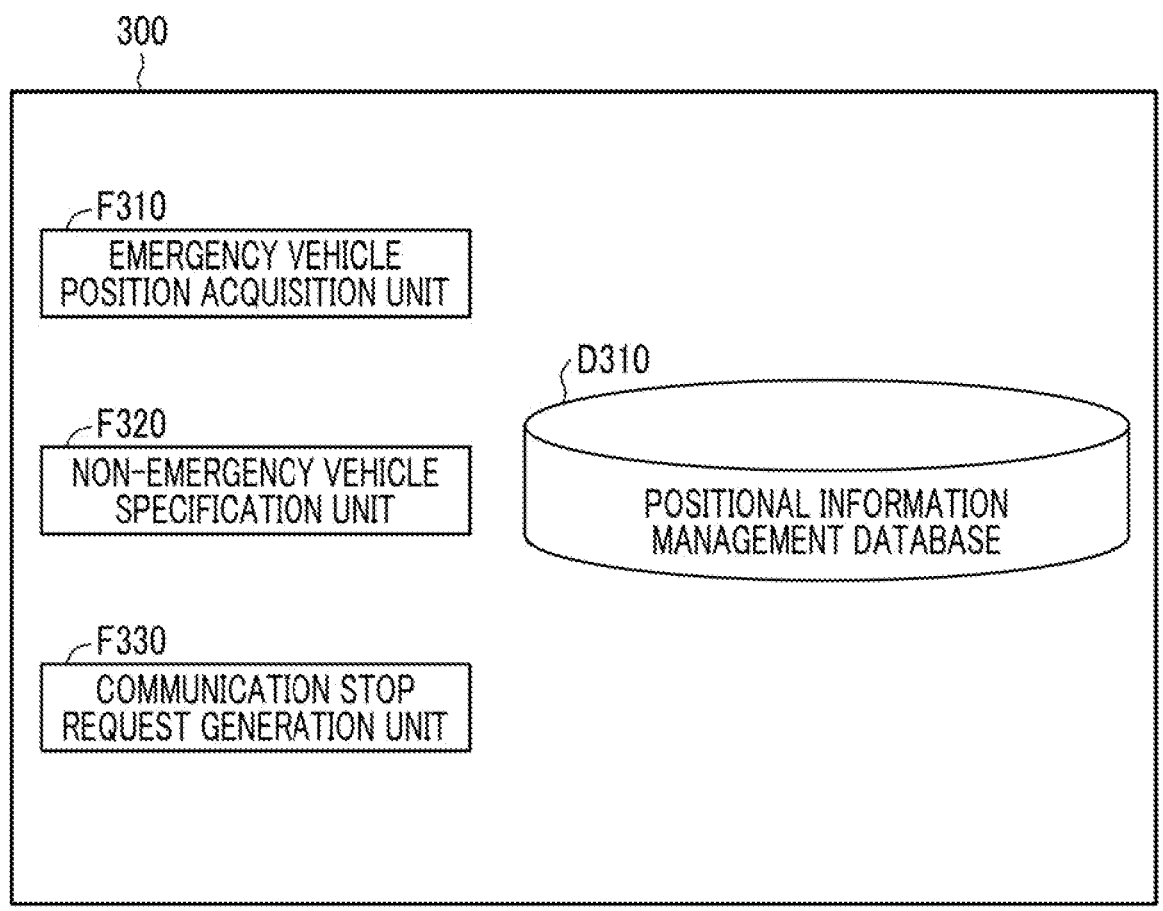
FIG. 3 is a block diagram showing the functional configuration of the server device.

Here, the functional configuration of the server device 300 will be described referring to FIG. 3. As shown in FIG. 3, the server device 300 of the embodiment includes, as functional components, an emergency vehicle position acquisition unit F310, a non-emergency vehicle specification unit F320, a communication stop request generation unit F330, and a positional information management database D310. The emergency vehicle position acquisition unit F310, the non-emergency vehicle specification unit F320, and the communication stop request generation unit F330 are formed by the processor 301 of the server device 300 executing a computer program on the main storage unit 302. Any one or a part of the emergency vehicle position acquisition unit F310, the non-emergency vehicle specification unit F320, and the communication stop request generation unit F330 may be formed by a hardware circuit. The positional information management database D310 is constructed by a program of a database management system (DBMS) executed by the processor 301 of the server device 300 managing data stored in the auxiliary storage unit 303. Such a positional information management database D310 is, for example, a relational database.

Any one of the functional components of the server device 300 or a part of the processing may be executed by another computer connected to the network N1. For example, each kind of processing included in the emergency vehicle position acquisition unit F310, each kind of processing included in the non-emergency vehicle specification unit F320, and each kind of processing included in the communication stop request generation unit F330 may be executed by separate computers.

Figures 4, 5:
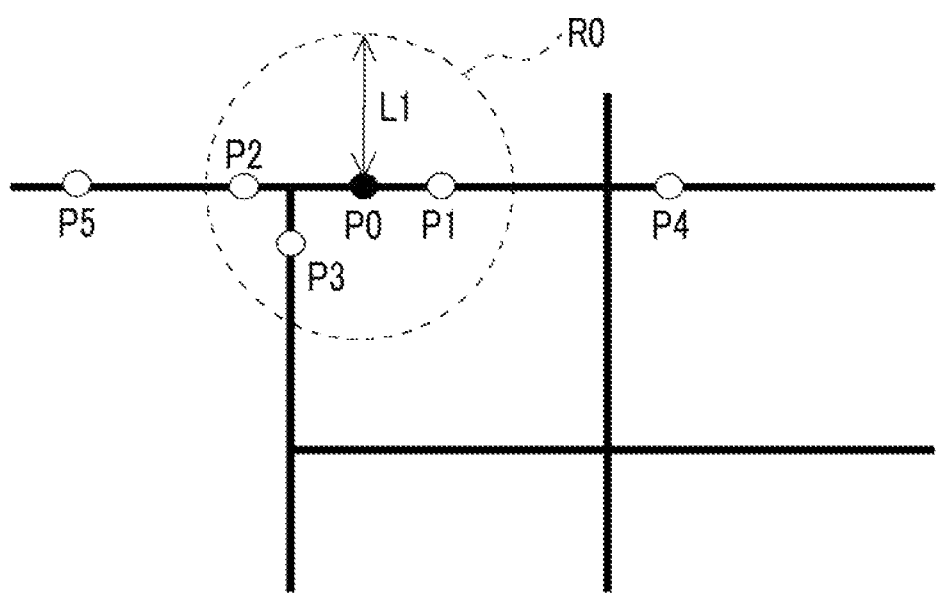
FIG. 4 is a diagram showing a configuration example of a positional information table.
FIG. 5 is a diagram illustrating an execution method of specification processing.

In the positional information management database D310, information for identifying each non-emergency vehicle 20 under the management of the server device 300 and the current position of each non-emergency vehicle 20 are associated with each other. Here, a configuration example of information stored in the positional information management database D310 will be described referring to FIG. 4. FIG. 4 is a diagram showing the table configuration of information stored in the positional information management database D310. The configuration of a table (hereinafter, also referred to as a "positional information table") stored in the positional information management database D310 is not limited to the example shown in FIG. 4, and fields may be suitably added, changed, and deleted.

The positional information table shown in FIG. 4 has fields of vehicle ID, positional information, reception date and time, and the like. In the vehicle ID field, information (vehicle ID) for allowing the server device 300 to identify each non-emergency vehicle 20 is registered. The vehicle ID registered in the vehicle ID field may be, for example, information indicating a communication address of the second in-vehicle device 200 mounted in each non-emergency vehicle 20. In the positional information field, information indicating the current position of each non-emergency vehicle 20 is registered. The positional information registered in the positional information field may be, for example, information indicating an address where each non-emergency vehicle 20 is positioned or information indicating coordinates (latitude and longitude) of a place where each non-emergency vehicle 20 is positioned on a map. In the reception date and time field, information indicating date and time on which the server device 300 receives information input to the positional information field is registered. It is assumed that information input to the positional information field and the reception date and time field are updated each time server device 300 receives the positional information from each non-emergency vehicle 20 (in the above-described predetermined cycle).

The emergency vehicle position acquisition unit F310 acquires the current position of the emergency vehicle 10 during emergency traveling. Specifically, the emergency vehicle position acquisition unit F310 receives the positional information transmitted from the first in-vehicle device 100 of the emergency vehicle 10 during emergency traveling in each predetermined cycle through the communication unit 304 to acquire the current position of the emergency vehicle 10 during emergency traveling. The current position acquired in such a manner is delivered from the emergency vehicle position acquisition unit F310 to the non-emergency vehicle specification unit F320.

The non-emergency vehicle specification unit F320 specifies the non-emergency vehicle 20 within the predetermined distance from the current position of the emergency vehicle 10 based on the current position of the emergency vehicle 10 acquired by the emergency vehicle position acquisition unit F310 (hereinafter, also referred to as "specification processing"). Specifically, the non-emergency vehicle specification unit F320 accesses the positional information management database D310 to extract all positional information tables where the positional information belonging to the range within the predetermined distance from the current position of the emergency vehicle 10 is registered in the positional information field. Then, the non-emergency vehicle specification unit F320 extracts the vehicle IDs registered in the vehicle ID fields of the extracted positional information tables to specify the non-emergency vehicles 20 within the predetermined distance from the current position of the emergency vehicle 10.

Here, an example of the specification processing in the non-emergency vehicle specification unit F320 will be described referring to FIG. 5. FIG. 5 is a diagram schematically showing the positional relationship between the current position of the emergency vehicle and the non-emergency vehicle. P0 in FIG. 5 indicates the current position of the emergency vehicle, and P1 to P5 in FIG. 5 indicate the positions of five non-emergency vehicles. L1 in FIG. 5 corresponds to the predetermined distance. In the example shown in FIG. 5, while P1, P2, and P3 belong to a range RO of a radius L1, centering on the current position P0 of the emergency vehicle, P4 and P5 do not belong to the range RO. Thus, the non-emergency vehicle specification unit F320 may extract, from among the positional information tables stored in the positional information management database D310, the positional information table where information indicating the position of P1 is registered in the positional information field, the positional information table where information indicating the position of P2 is registered in the positional information field, and the positional information table where information indicating the position of P3 is registered in the positional information field. Then, the non-emergency vehicle specification unit F320 may extract the vehicle ID registered in the vehicle ID field of each of the extracted three positional information tables to specify the non-emergency vehicles in the range RO within the predetermined distance L1 from the current position P0 of the emergency vehicle. The vehicle ID of each of the non-emergency vehicles specified in such a manner is delivered from the non-emergency vehicle specification unit F320 to the communication stop request generation unit F330. The specification processing in the non-emergency vehicle specification unit F320 is executed each time the server device 300 receives the positional information transmitted from the first in-vehicle device 100 in each predetermined cycle.

The communication stop request generation unit F330 generates the communication stop request. Then, the communication stop request generation unit F330 transmits the generated communication stop request to the second in-vehicle device 200 of each of the non-emergency vehicles 20 specified by the non-emergency vehicle specification unit F320. The communication stop request in the example is information for prompting the occupant of each of the non-emergency vehicles 20 to stop the use of wireless communication while notifying the occupant of each of the non-emergency vehicles 20 of the approach of the emergency vehicle 10. Specifically, the communication stop request includes a command for making the second in-vehicle device 200 of each of the non-emergency vehicles 20 execute the processing for notifying the occupant of each of the non-emergency vehicles 20 of the approach of the emergency vehicle 10 and the processing for prompting the occupant of each of the non-emergency vehicles 20 to stop the use of wireless communication. The communication stop request may include information for notifying the occupant of each of the non-emergency vehicles of the time (communication stop time) for which the use of wireless communication is stopped. That is, the communication stop request may include a command for making the second in-vehicle device 200 of each of the non-emergency vehicles 20 execute the processing for notifying the occupant of each of the non-emergency vehicles 20 of the communication stop time, in addition to the command for making the second in-vehicle device 200 of each of the non-emergency vehicles 20 execute the processing for notifying the occupant of each of the non-emergency vehicles 20 of the approach of the emergency vehicle 10 and the processing for prompting the occupant of each of the non-emergency vehicles 20 to stop the use of wireless communication. The communication stop request generated in such a manner is transmitted to the second in-vehicle device 200 of each of the non-emergency vehicles 20 specified by the non-emergency vehicle specification unit F320 through the communication unit 304. The generation processing of the communication stop request and the transmission processing of the communication stop request in the communication stop request generation unit F330 are executed each time the server device 300 receives the positional information transmitted from the first in-vehicle device 100 in each predetermined cycle.

Functional Configuration of Second In-Vehicle Device

Figure 6:
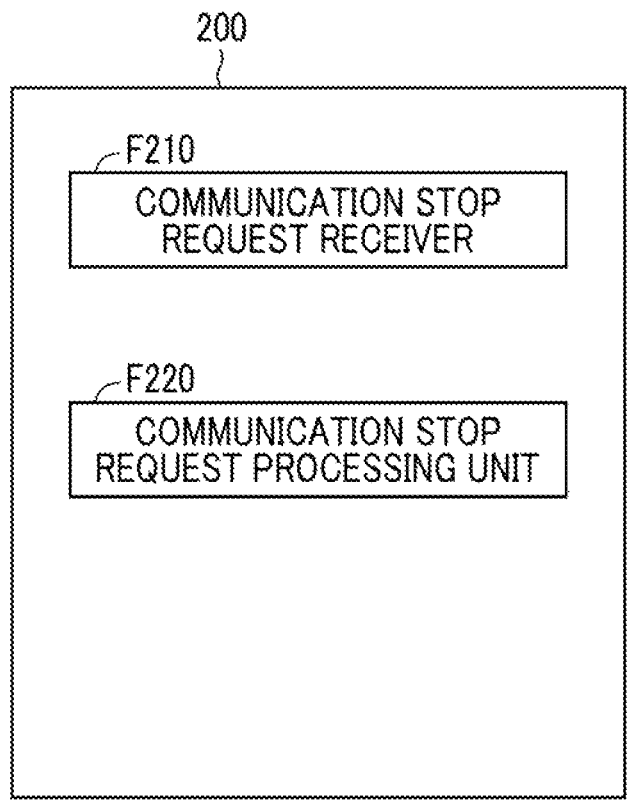
FIG. 6 is a block diagram showing the functional configuration of the second in-vehicle device.

FIG. 6 is a diagram illustrating the functional configuration of the second in-vehicle device 200. As shown in FIG. 6, the second in-vehicle device 200 in the example includes, as functional components, a communication stop request receiver F210 and a communication stop request processing unit F220. The communication stop request receiver F210 and the communication stop request processing unit F220 are formed by the processor 201 of the second in-vehicle device 200 executing the computer program on the main storage unit 202. Any one of the functional components or a part of the processing may be executed by a hardware circuit.

The communication stop request receiver F210 receives the communication stop request, which is transmitted from the server device 300, through the communication unit 207. The communication stop request received in such a manner is delivered from the communication stop request receiver F210 to the communication stop request processing unit F220.

The communication stop request processing unit F220 executes processing according to the communication stop request when the communication stop request is received from the communication stop request receiver F210. As described above, the communication stop request in the example includes the command for making the second in-vehicle device 200 execute the processing for notifying the occupant of the non-emergency vehicle 20 of the approach of the emergency vehicle 10 and the processing for prompting the occupant of the non-emergency vehicle 20 to stop the use of wireless communication. Accordingly, the communication stop request processing unit F220 makes the display unit 204 display, for example, character information for notifying of the approach of the emergency vehicle 10 and character information for prompting to stop the use of wireless communication. The communication stop request processing unit F220 may make a voice output device, such as a speaker mounted in the non-emergency vehicle 20, output a voice message for notifying of the approach of the emergency vehicle 10 and a voice message for prompting to stop the use of wireless communication. The communication stop request processing unit F220 may the display unit 204 display the character information for notifying of the approach of the emergency vehicle 10 and the character information for prompting to stop the use of wireless communication and may make the voice output device output the voice message for notifying of the approach of the emergency vehicle 10 and the voice message for prompting to stop the use of wireless communication.

Flow of Processing

Figure 7:
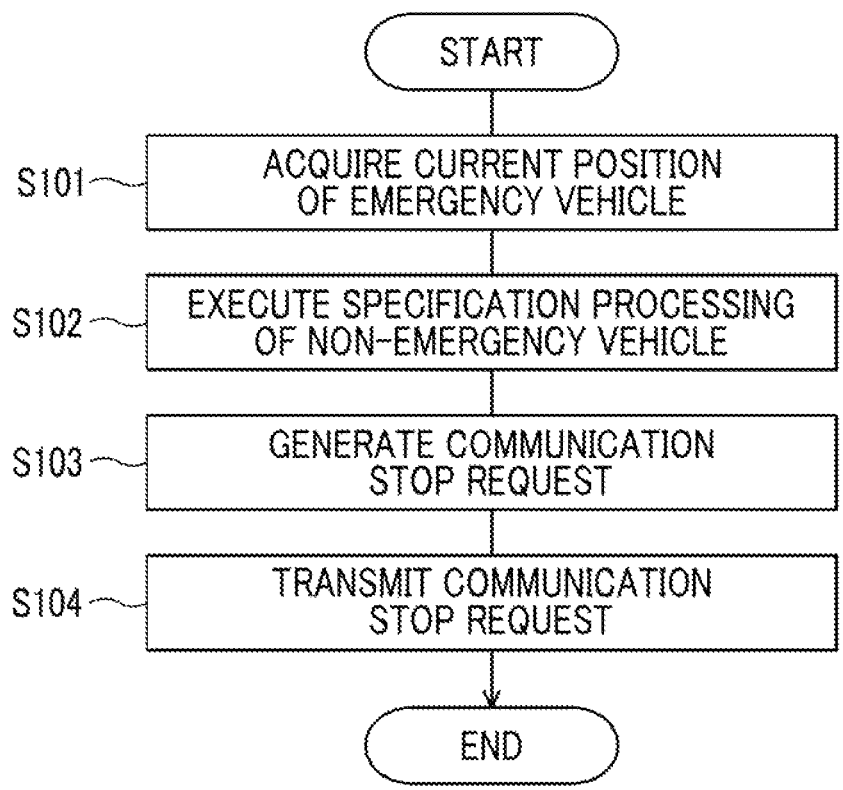
FIG. 7 is a flowchart showing a processing flow that is executed by the server device in the first embodiment.

Next, a flow of processing that is executed by the server device 300 in the embodiment will be described referring to FIG. 7. FIG. 7 is a flowchart showing a processing flow that is executed by the server device 300 with the reception of the positional information (information indicating the current position of the emergency vehicle 10) transmitted from the first in-vehicle device 100 as a trigger.

In the processing flow of FIG. 7, in a case where the communication unit 304 of the server device 300 receives the positional information transmitted from the first in-vehicle device 100 of the emergency vehicle 10 during emergency traveling, the emergency vehicle position acquisition unit F310 acquires the current position of the emergency vehicle 10 during emergency traveling from the positional information (Step S101). The current position of the emergency vehicle 10 acquired in such a manner is delivered from the emergency vehicle position acquisition unit F310 to the non-emergency vehicle specification unit F320.

The non-emergency vehicle specification unit F320 specifies the non-emergency vehicle 20 within the predetermined distance from the current position of the emergency vehicle 10 (Step S102). In detail, as described referring to FIG. 5, the non-emergency vehicle specification unit F320 accesses the positional information management database D310 based on the current position of the emergency vehicle 10 to extract all positional information tables where the positional information belonging to the range within the predetermined distance from the current position of the emergency vehicle is registered in the positional information field. Subsequently, the non-emergency vehicle specification unit F320 extracts the vehicle ID registered in the vehicle ID field of each of the extracted positional information tables. The vehicle ID extracted in such a manner is delivered from the non-emergency vehicle specification unit F320 to the communication stop request generation unit F330.

The communication stop request generation unit F330 generates the communication stop request including the command for making the second in-vehicle device 200 execute the processing for notifying the occupant of the non-emergency vehicle of the approach of the emergency vehicle 10 and the command for making the second in-vehicle device 200 execute the processing for prompting the occupant of the non-emergency vehicle 20 to stop the use of wireless communication (Step S103). The communication stop request generation unit F330 may generate the communication stop request including the command for making the second in-vehicle device 200 execute the processing for notifying the occupant of the non-emergency vehicle 20 of the communication stop time, in addition to the command for making the second in-vehicle device 200 execute the processing for notifying the occupant of the non-emergency vehicle of the approach of the emergency vehicle 10 and the command for making the second in-vehicle device 200 execute the processing for prompting the occupant of the non-emergency vehicle 20 to stop the use of wireless communication. In this case, the communication stop request generation unit F330 may calculate the communication stop time based on the traveling speed of the emergency vehicle 10, the congestion information of the route along which the emergency vehicle 10 is traveling, or the like. For example, when the traveling speed of the emergency vehicle 10 is high, calculation may be performed such that the communication stop time is shorter than when the traveling speed of the emergency vehicle 10 is low. Furthermore, when the degree of congestion of the route along which the emergency vehicle 10 is traveling is large, calculation may be performed such that the communication stop time is longer than when the degree of congestion of the route along which the emergency vehicle 10 is traveling is small. The traveling speed of the emergency vehicle 10 may be transmitted from the first in-vehicle device 100 to the server device 300 along with the positional information when the positional information of the emergency vehicle 10 is transmitted from the first in-vehicle device 100 to the server device 300 or the server device 300 may calculate the traveling speed of the emergency vehicle 10 based on variation of the position of the emergency vehicle 10 in each predetermined cycle. The degree of congestion of the route along which the emergency vehicle 10 is traveling may be obtained using Vehicle Information and Communication System (VICS (Registered Trademark)) or may be obtained using probe traffic information that is generated based on a position where another vehicle actually travels, a vehicle speed of the another vehicle, or the like.

In a case where the communication stop request is generated in the above-described manner, the communication stop request generation unit F330 transmits the communication stop request to the second in-vehicle device 200 of the non-emergency vehicle 20 specified by the non-emergency vehicle specification unit F320 (Step S104).

According to the processing flow of FIG. 7, in the non-emergency vehicle within the predetermined distance from the position of the emergency vehicle 10, the second in-vehicle device 200 can receive the communication stop request transmitted from the server device 300. In this case, in the second in-vehicle device 200, the communication stop request receiver F210 delivers the communication stop request received through the communication unit 207 to the communication stop request processing unit F220. Then, the communication stop request processing unit F220 executes the processing for notifying the occupant of the non-emergency vehicle 20 of the approach of the emergency vehicle 10 and the processing for prompting the occupant of the non-emergency vehicle 20 to stop the use of wireless communication according to the commands included in the communication stop request. Specifically, as described above, the communication stop request processing unit F220 makes the display unit 204, the speaker, or the like output the character information or the voice message for notifying of the approach of the emergency vehicle 10 and the character information or the voice message for prompting to stop the use of wireless communication. With this, in the non-emergency vehicle 20 within the predetermined distance from the position of the emergency vehicle 10, it is possible to make the occupant of the non-emergency vehicle 20 recognize the approach of the emergency vehicle 10 and stop the use of wireless communication. As a result, it is possible to allow the occupant of the non-emergency vehicle 20 to smoothly perform a driving operation or the like to make way for the emergency vehicle 10, and to suppress an increase in communication traffic near the emergency vehicle 10. In a case where an increase in communication traffic near the emergency vehicle 10 is suppressed, it is possible to secure the quality of communication to be performed by the first in-vehicle device 100. With this, it is possible to suitably perform acquisition of information through wireless communication even while the emergency vehicle 10 is moving.

When the command for notifying the occupant of the non-emergency vehicle 20 of the communication stop time is included in the communication stop request, the communication stop request processing unit F220 makes the display unit 204, the speaker, or the like output character information or a voice message indicating the communication stop time of wireless communication, in addition to the character information or the voice message for notifying of the approach of the emergency vehicle and the character information or the voice message for prompting to stop the use of wireless communication. In this case, it is possible to allow the occupant of the non-emergency vehicle 20 to restart the use of wireless communication with the communication stop time as a reference. With this, it is possible to minimize degradation of the convenience of the occupant of the non-emergency vehicle 20. The communication stop request processing unit F220 may execute the processing for notifying the occupant that the stop of the use of wireless communication is releasable when the communication stop time has elapsed after the communication stop request is received. Modification Example of First Embodiment Next, a modification example of the above-described first embodiment will be described. In the modification example, detailed description of the substantially same configurations and the substantially same control processing as in the first embodiment will not be repeated.

In the above-described embodiment, an example where the communication stop request is transmitted to the non-emergency vehicle 20 near the emergency vehicle 10 regardless of a communication system usable by the first in-vehicle device 100 at the current position of the emergency vehicle 10 has been described. In contrast, in the modification example, when a communication system usable by the first in-vehicle device 100 at the current position of the emergency vehicle 10 is a predetermined communication system, the communication stop request is not transmitted to the non-emergency vehicle 20 near the emergency vehicle 10.

Here, in a case where a communication system usable at the current position of the emergency vehicle 10 is a communication system in which high-speed and large-capacity wireless communication can be performed, such as 5G or a mobile communication standard after 5G, even though wireless communication with a comparatively large data transfer amount is performed in the non-emergency vehicle 20 near the emergency vehicle 10, the quality of wireless communication to be performed by the first in-vehicle device 100 can be secured.

Figure 8:
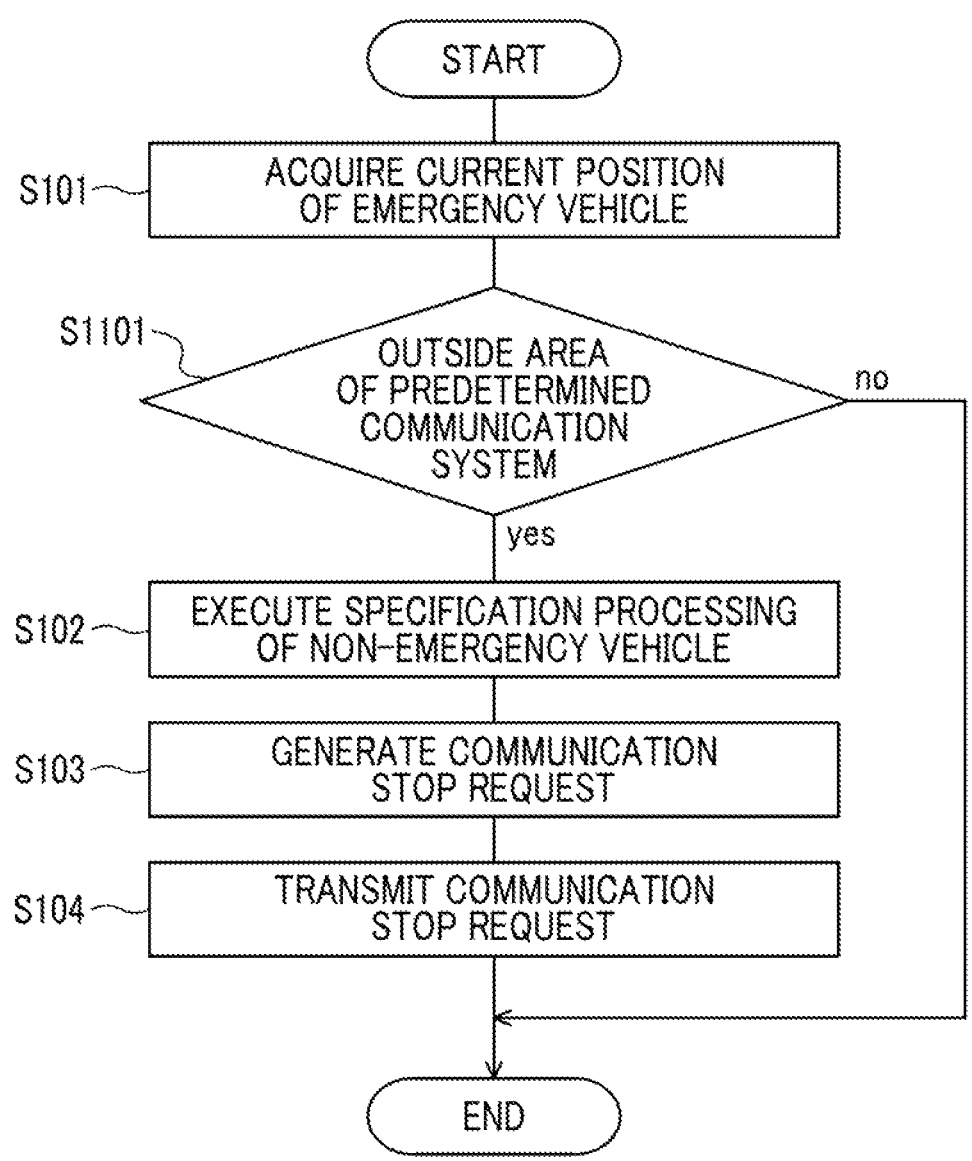
FIG. 8 is a flowchart showing a processing flow that is executed by the server device in a modification example of the first embodiment.

Accordingly, in the modification example, when the server device 300 receives the positional information transmitted from the first in-vehicle device 100, the server device 300 may operate according to a processing flow of FIG. 8. As in FIG. 7, the processing flow shown in FIG. 8 is executed with the reception of the positional information from the first in-vehicle device 100 as a trigger. In FIG. 8, the same processing as in FIG. 7 described above is represented by the same reference numerals.

Figure 9:
FIG. 9 is a diagram showing an example of map information in which an area where a predetermined communication system is usable is identifiable.

In the processing flow of FIG. 8, after the processing of Step S101 is executed, processing of Step S1101 is executed. In Step S1101, the emergency vehicle position acquisition unit F310 determines whether or not the current position of the emergency vehicle 10 acquired in Step S101 is outside an area of a predetermined communication system. That is, the emergency vehicle position acquisition unit F310 determines whether or not the current position of the emergency vehicle 10 deviates from the area where the predetermined communication system is usable. The term "predetermined communication system" used herein is a communication system in which high-speed and large-capacity wireless communication can be performed, and even though wireless communication with a comparatively large data transfer amount is performed in the non-emergency vehicle near the emergency vehicle 10, the quality of wireless communication to be performed by the first in-vehicle device 100 can be secured, such as 5G or a mobile communication standard after 5G. In regard to the area where such a predetermined communication system is usable, map information for identifying the area may be stored in advance in the main storage unit 302 or the auxiliary storage unit 303 of the server device 300. The map information may be acquired using an external service. FIG. 9 is a diagram showing an example of the map information for identifying the area where the predetermined communication system is usable. In FIG. 9, hatched areas indicate areas where the predetermined communication system is usable. The emergency vehicle position acquisition unit F310 plots the current position of the emergency vehicle on a map shown in FIG. 9 and determines whether or not the plotted position belongs to the area where the predetermined communication system is usable (belongs to the hatched area in FIG. 9).

Here, in a case where the current position of the emergency vehicle 10 is within the area of the predetermined communication system (in Step S1101, negative determination), the server device 300 does not execute the processing of S102 to S104 and ends the processing flow. On the other hand, in a case where the current position of the emergency vehicle 10 is outside the area of the predetermined communication system (in Step S1101, affirmative determination), the server device 300 executes the processing of S102 to S104.

According to the processing flow of FIG. 8, when the position of the emergency vehicle 10 is within the area where the predetermined communication system is usable, it is possible to secure the quality of wireless communication to be performed by the first in-vehicle device 100 without restricting the use of wireless communication in the non-emergency vehicle 20 near the emergency vehicle 10. With this, it is possible to further minimize degradation of the convenience of the occupant of the non-emergency vehicle 20.

Second Embodiment

In the above-described first embodiment, although an example where the communication stop request to the second in-vehicle device 200 is transmitted from the server device 300 has been described, an example where the communication stop request to the second in-vehicle device 200 is transmitted from the first in-vehicle device 100 will be described.

Figure 10:
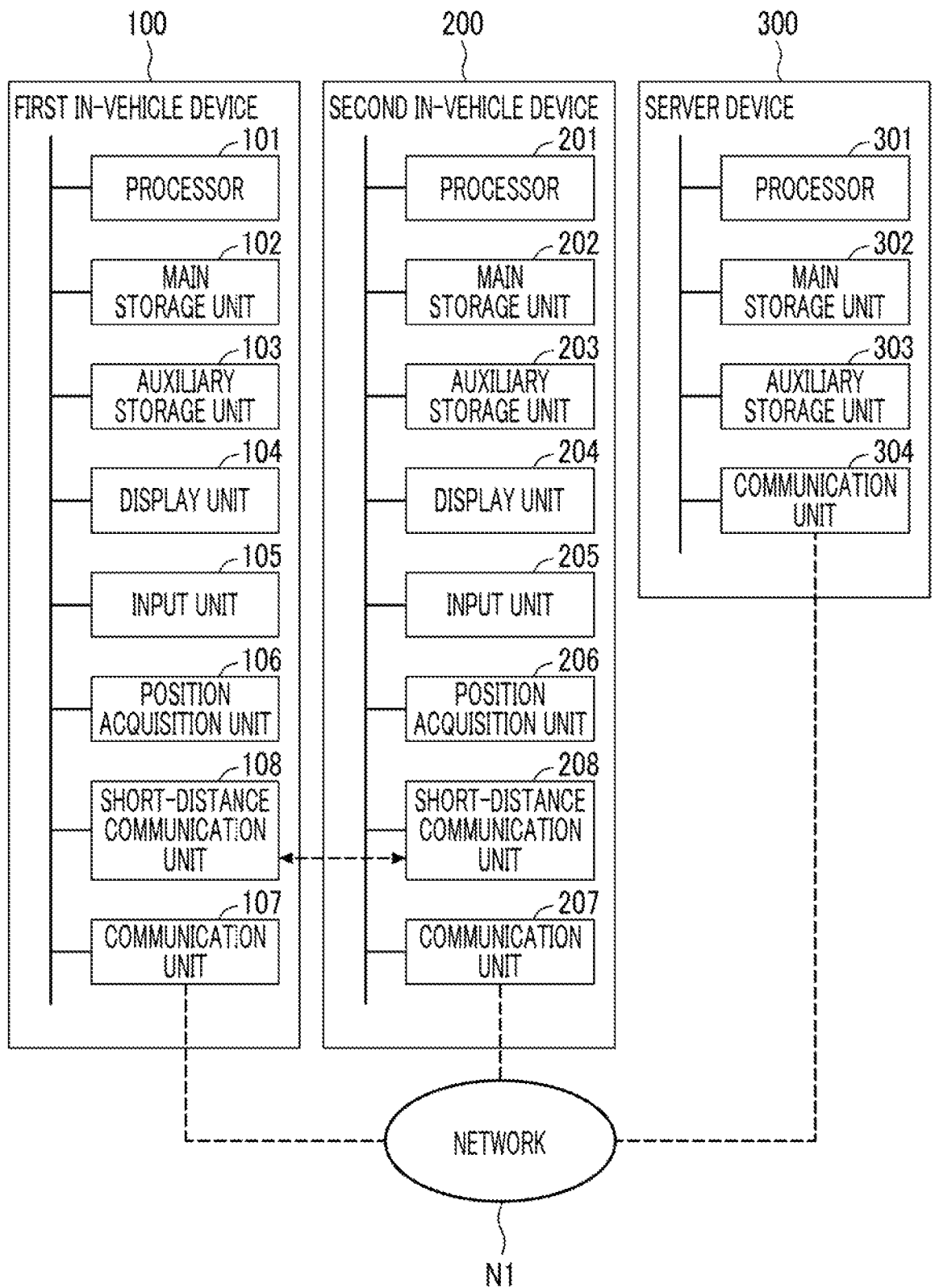
FIG. 10 is a diagram showing an example of the hardware configuration of each of a first in-vehicle device, a second in-vehicle device, and a server device in a second embodiment.

FIG. 10 is a diagram showing an example of the hardware configuration of each of a first in-vehicle device 100, a second in-vehicle device 200, and a server device 300 in the embodiment. The hardware configuration of the server device 300 is the same as in the above-described first embodiment, and thus, description thereof will not be repeated.

The first in-vehicle device 100 has a short-distance communication unit 108, in addition to the processor 101, the main storage unit 102, the auxiliary storage unit 103, the display unit 104, the input unit 105, the position acquisition unit 106, and the communication unit 107. The processor 101, the main storage unit 102, the auxiliary storage unit 103, the display unit 104, the input unit 105, the position acquisition unit 106, and the communication unit 107 are the same as those of the first in-vehicle device 100 in the above-described first embodiment, and thus, description thereof will not be repeated. The short-distance communication unit 108 performs communication at a short distance (to such an extent that communication within a predetermined distance can be performed) using a predetermined wireless communication standard. In the example, the short-distance communication unit 108 performs data communication using BLE. The short-distance communication unit 108 may perform short-distance communication using NFC, UWB, Wi-Fi, or the like.

The second in-vehicle device 200 has a short-distance communication unit 208, in addition to the processor 201, the main storage unit 202, the auxiliary storage unit 203, the display unit 204, the input unit 205, the position acquisition unit 206, and the communication unit 207. The processor 201, the main storage unit 202, the auxiliary storage unit 203, the display unit 204, the input unit 205, the position acquisition unit 206, the communication unit 207, and the short-distance communication unit 208 are the same as the processor 101, the main storage unit 102, the auxiliary storage unit 103, the display unit 104, the input unit 105, the position acquisition unit 106, the communication unit 107, and the short-distance communication unit 108 of the first in-vehicle device 100, and thus, description thereof will not be repeated.

Figure 11:
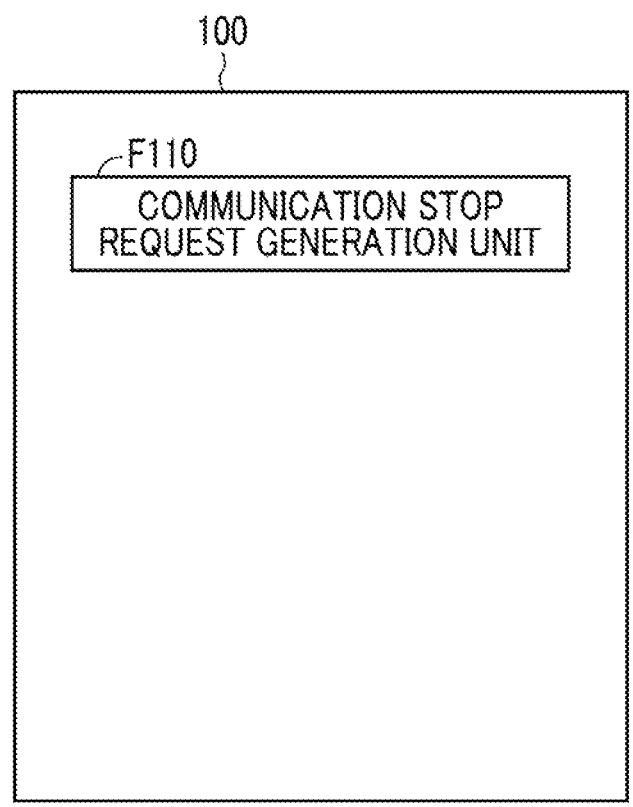
FIG. 11 is a diagram showing the functional configuration of the first in-vehicle device in the second embodiment.

Next, the functional configuration of the first in-vehicle device 100 in the embodiment will be described referring to FIG. 11. FIG. 11 is a block diagram illustrating the functional configuration of the first in-vehicle device 100 in the embodiment. As shown in FIG. 11, the first in-vehicle device 100 in the example includes, as a functional component, a communication stop request generation unit F110. The communication stop request generation unit F110 is formed by the processor 101 of the first in-vehicle device 100 executing the computer program on the main storage unit 102. A part of the function of the communication stop request generation unit F1110 may be executed by a hardware circuit.

The communication stop request generation unit F110 generates the communication stop request and transmits the generated communication stop request through broadcast communication. A generation method of the communication stop request is the same as in the above-described first embodiment, and thus, description thereof will not be repeated. The communication stop request generation unit F110 transmits the generated communication stop request through broadcast communication using the short-distance communication unit 108. Here, as described above, since a distance at which a radio wave transmitted from the short-distance communication unit 108 reaches is substantially equal to the predetermined distance, the communication stop request transmitted through the short-distance communication unit 108 is inevitably received by the second in-vehicle device 200 (short-distance communication unit 208) of the non-emergency vehicle 20 within the predetermined distance from the current position of the emergency vehicle 10. That is, even though the processing for specifying the non-emergency vehicle 20 within the predetermined distance from the current position of the emergency vehicle 10 is not executed on the first in-vehicle device 100 side, the communication stop request is received solely by the second in-vehicle device 200 of the non-emergency vehicle 20 near the emergency vehicle 10. It is assumed that the generation processing of the communication stop request and the transmission processing of the communication stop request in the communication stop request generation unit F110 are repeatedly executed in a predetermined cycle when the emergency vehicle 10 is in the emergency traveling state.

According to the embodiment, it is possible to obtain the same operation and effects as in the above-described first embodiment without depending on the server device 300. With this, it is possible to reduce the load of the server device 300.

Others

The above-described embodiments are just examples, and the disclosure may be appropriately modified and carried out without departing from the spirit and scope of the disclosure.

The processing or units described in the present disclosure can be freely combined and implemented as long as no technical contradiction arises. Processing described to be executed by one device may be shared and executed by a plurality of devices. Alternatively, processing described to be executed by different devices may be executed by one device. In a computer system, a hardware configuration that implements each function may be flexibly changed.

The disclosure may also be implemented by supplying a computer program mounted with the functions described in the above-described embodiments to a computer and causing one or more processors in the computer to read and execute the program. Such a computer program may be provided to the computer by a non-transitory computer-readable storage medium connectable to a system bus of the computer or may be provided to the computer through a network. The non-transitory computer-readable storage medium is a recording medium that stores information, such as data or programs, by means of electrical, magnetic, optical, mechanical, or chemical action and can be read from a computer or the like, and is, any type of disk, such as a magnetic disk (a Floppy (Registered Trademark) disk, a hard disk drive (HDD), or the like), an optical disc (a CD-ROM, a DVD, a Blu-ray disc, or the like), or a medium, such as a read only memory (ROM), a random access memory (RAM), an EPROM, an EEPROM, a magnetic card, a flash memory, an optical card, or a solid state drive (SSD).

What is claimed is:

1. A server device configured to communicate with a communication device mounted in a vehicle, the server device comprising a controller configured to execute:
   acquiring a position of an emergency vehicle;
   identifying a non-emergency vehicle at a predetermined distance from the acquired position of the emergency vehicle; and
   transmitting, to a communication device mounted in the non-emergency vehicle, a request as information requiring the non-emergency vehicle to stop use of wireless communication.

2. The server device according to claim 1, wherein the request includes information indicating a communication stop time as a time during which the use of the wireless communication is stopped.

3. The server device according to claim 2, wherein the controller is configured to calculate the communication stop time based on at least one of a traveling speed of the emergency vehicle and congestion information of a route along which the emergency vehicle is traveling.

4. The server device according to claim 1, wherein the controller is configured to transmit the request to the communication device of the non-emergency vehicle only when the position of the emergency vehicle is outside an area where a predetermined communication system is usable.

5. The server device according to claim 2, wherein the controller is configured to transmit the request to the communication device of the non-emergency vehicle only when the position of the emergency vehicle is outside an area where a predetermined communication system is usable.

6. The server device according to claim 3, wherein the controller is configured to transmit the request to the communication device of the non-emergency vehicle only when the position of the emergency vehicle is outside an area where a predetermined communication system is usable.

7. An in-vehicle device mounted in an emergency vehicle and configured to communicate with a device outside the emergency vehicle, the in-vehicle device comprising:
   a controller configured to transmit, to a communication device mounted in a non-emergency vehicle, a request as information requiring the non-emergency vehicle to stop use of wireless communication when the non-emergency vehicle is a predetermined distance from a position of the emergency vehicle.

8. The in-vehicle device according to claim 7, further comprising a short-distance communication device configured to transmit the request to the non-emergency vehicle.

9. The in-vehicle device according to claim 8, wherein the predetermined distance from the position of the emergency vehicle is equal to a communicable range of the short-distance communication device.

10. The in-vehicle device according to claim 7, wherein the request includes information indicating a communication stop time as a time during which the use of the wireless communication is stopped.

11. The in-vehicle device according to claim 10, wherein the controller is configured to calculate the communication stop time based on at least one of a traveling speed of the emergency vehicle and congestion information of a route along which the emergency vehicle is traveling.

12. The in-vehicle device according to claim 9, wherein the request includes information indicating a communication stop time as a time during which the use of the wireless communication is stopped.

13. The in-vehicle device according to claim 7, wherein the controller is configured to transmit the request to the communication device of the non-emergency vehicle only when the position of the emergency vehicle is outside an area where a predetermined communication system is usable.

14. The in-vehicle device according to claim 9, wherein the controller is configured to transmit the request to the communication device of the non-emergency vehicle only when the position of the emergency vehicle is outside an area where a predetermined communication system is usable.

15. An information processing method comprising:
acquiring a position of an emergency vehicle;
specifying a non-emergency vehicle at a predetermined distance from the acquired position of the emergency vehicle; and
transmitting a request as information requiring the non-emergency vehicle to stop use of wireless communication to a communication device mounted in the non-emergency vehicle.

16. The information processing method according to claim 15, wherein the request includes information indicating a communication stop time as a time during which the use of the wireless communication is stopped.

17. The information processing method according to claim 16, wherein the communication stop time is based on at least one of a traveling speed of the emergency vehicle and congestion information of a route along which the emergency vehicle is traveling.

18. The information processing method according to claim 15, wherein the request is only transmitted to the communication device of the non-emergency vehicle in a case where the position of the emergency vehicle is outside an area where a predetermined communication system is usable.

19. The information processing method according to claim 16, wherein the request is only transmitted to the communication device of the non-emergency vehicle in a case where the position of the emergency vehicle is within an area where a predetermined communication system is usable.

20. The information processing method according to claim 17, wherein the request is only transmitted to the communication device of the non-emergency vehicle in a case where the position of the emergency vehicle is within an area where a predetermined communication system is usable.

* * * * *